United States Patent [19]
Adams

[11] Patent Number: 5,992,806
[45] Date of Patent: Nov. 30, 1999

[54] SUCTION CUP SIGN HOLDER

[75] Inventor: William E. Adams, Portersville, Pa.

[73] Assignee: Adams Mfg. Corp., Portersville, Pa.

[21] Appl. No.: 08/897,121

[22] Filed: Jul. 18, 1997

[51] Int. Cl.[6] .................................................. A45D 42/14
[52] U.S. Cl. ...................................... 248/205.8; 248/362
[58] Field of Search ........................... 248/205.5, 205.8, 248/206.2, 206.3, 467, 362, 363, 205.9; 411/456, 455, 453, 454, 452, 451, 143, 144, 138; 52/364, 549, 506; D20/43

[56] References Cited

U.S. PATENT DOCUMENTS

| | | | |
|---|---|---|---|
| D. 311,933 | 11/1990 | Adams | D20/43 |
| 639,715 | 12/1899 | Crosby | 411/138 |
| 2,007,311 | 7/1935 | Shearman | 411/456 |
| 2,131,687 | 9/1938 | Kaplan | 294/64 |
| 2,138,340 | 11/1938 | Chemidlin | 238/10 R |
| 2,154,966 | 4/1939 | Vanderveer | 52/103 |
| 2,277,981 | 3/1942 | Horton | 40/556 |
| 2,370,938 | 3/1945 | Cohen | 294/64.1 |
| 3,254,435 | 6/1966 | Rix | 40/593 |
| 3,300,173 | 1/1967 | Kennedy, Jr. | 248/467 |
| 3,338,293 | 8/1967 | Hohmann | 160/370.21 |
| 4,003,175 | 1/1977 | Patry | 52/506 |
| 4,034,788 | 7/1977 | Melone | 151/37 |
| 4,197,616 | 4/1980 | Panuski | 24/73 R |
| 5,011,354 | 4/1991 | Brownlee | 411/439 |
| 5,087,005 | 2/1992 | Holoff et al. | 248/205.8 |
| 5,090,855 | 2/1992 | Terry | 411/144 |
| 5,190,423 | 3/1993 | Ewing | 411/134 |
| 5,405,112 | 4/1995 | Trethewey | 248/205.8 |
| 5,492,452 | 2/1996 | Kirsch et al. | 411/455 |
| 5,511,752 | 4/1996 | Trethewey | 248/205.9 |
| 5,588,476 | 12/1996 | Trethewey | 160/370.21 |
| 5,611,511 | 3/1997 | Lee | 248/205.8 |

*Primary Examiner*—Ramon O. Ramirez
*Assistant Examiner*—Tan Le
*Attorney, Agent, or Firm*—Buchanan Ingersoll, P.C.

[57] ABSTRACT

A suction sign holder is provided having a suction cup and a tack. The suction cup and tack having mating surfaces between which a sign is held. The mating surfaces can be provided with a plurality of concentric grooves and ridges or other projections which mate together and frictionally hold a sign therebetween. The shaft of the tack can be provided with a raised rib or a groove disposed on the shaft of the tack at an angle. The rib may additionally have a sloping leading edge and a perpendicular trailing edge such that the shaft is easily inserted yet resists backing out of the bore.

18 Claims, 5 Drawing Sheets

SUCTION CUP SIGN HOLDER

BACKGROUND OF THE INVENTION

1. Field of the Invention

The invention relates generally to suction cups for holding objects, and more particularly to a suction cup with a removable tack for holding objects such as signs.

2. Description of the Prior Art

For many years businesses have been hanging signs using thumb tacks and suction cups. It is quite common to provide a suction cup with a tack that is pressed into the top of the suction cup. In my U.S. Design Pat. No. 311,933 I disclose one such suction cup and tack sign holder. This type of sign holder has become popular among the owners of retail establishments and particularly fast food chains for hanging signs in their windows. In many fast food restaurants there are booths or tables near windows on which signs have been held using suction cup with tack type holders. Oftentimes these signs are within easy reach of patrons. Some customers, particularly children, have pulled the signs causing the sign to tear or the tack to pop out of the suction cup. Other children have attempted to pull the tack from the suction cup. Some tacks used with suction cups have a sharp metal tip which could injure one who steps on it or otherwise presses his body against it. For this reason tacks used with suction cups have a blunt plastic tip that fits into a longitudinal bore in the neck of the suction cup. Because even blunt tacks are small they also pose a potential risk to small children who may put them in their mouths and swallow them. Thus, there is a need for a suction cup and tack combination in which the tack is difficult to remove by children. However, since the product is intended for reuse with different signs, it should not be unduly difficult for an adult to remove the tack from the suction cup.

There is also a need for a suction cup and tack type sign holder which more firmly grips the sign being held. Such a device would make it more difficult for children to tear the sign away from the holder. If this device is used it would also be less likely that a strong breeze would tear the sign away from its holder.

SUMMARY OF THE INVENTION

According to the present invention a suction cup tack is provided having a suction cup and a tack. The top of the suction cup and the undersurface of the tack each have mating surfaces which have provided thereon a plurality of interlocking projections, preferably mating grooves and ridges. The suction cup has a neck into which the tack is inserted. A bore is provided in the neck that passes through the surface which mates with the underside of the tack from which the shaft portion projects. The shaft of the tack is designed to be inserted through an aperture and into the bore. The tack portion also can make an aperture in some signs. As the tack is pressed into the neck, the area of the sign between the mating surfaces of the suction cup neck and the underside of the tack is securely held by the mating projections. Consequently, a greater downward force is required to tear the sign away from the holder.

The shaft of the tack may be cylindrical and has a raised rib provided thereon in order to permit air to escape from the bore in the mating surface of the suction cup when the shaft is inserted therein. By allowing air to escape, it is easier to push the tack into the cup and there is no compressed air at the bottom of the hole to push out the tack thereby slightly reducing the gripping surface. Consequently, a much tighter engagement of the shaft in the bore is accomplished such that the shaft resists backing out of the bore. Additionally, at least a portion of the longitudinal surface of the shaft can have a rough texture to further aid in allowing air to escape as the shaft is inserted into the bore and increase the frictional contact between the shaft of the tack and the wall of the bore. I prefer to provide a raised rib placed at an angle similar to the thread of a screw and may have a leading edge which is sloping and a back edge which is perpendicular such that the shaft is easily inserted into the bore yet resists backing out. The rib locks the cup into place so that the elastic cup and changes in temperature don't squeeze the tack out of the best gripping position.

In an alternative embodiment, the bore in the suction cup neck is provided with an undercut bottom portion and the shaft of the tack has an oversized tip portion. Thus, when the shaft is inserted into the bore the oversized tip portion is snugly retained in the undercut bottom portion to aid in preventing the shaft from backing out of the bore.

In another alternative embodiment, the mating surface of the suction cup is provided with a plurality of deformable projections while the mating surface of the tack is generally flat or indented to match them. Thus, the deformable projections grip the material of the sign as the flat mating surface compresses the sign against the deformable projections.

I also prefer to provide a gripping tab on the outer face of the tack. All sides of the tab are tapered at a slight draft of a few degrees, typically from 1° to 15°, which allows small fingers to easily slip from the tab yet can be securely held by adults. This tab makes it more difficult for children to pull the tack from the suction cup. A different tab which is shaped as an arc with each end attached to the outer surface of the tack is used when easier removal is desired. The open area under the arc enables one to better grasp and hold the tack.

Other details, objects and advantages of the invention will become apparent from the following description and the accompanying drawings of certain presently preferred embodiments thereof.

BRIEF DESCRIPTION THE DRAWING FIGURES

In the accompanying figures, certain preferred embodiments of the invention are illustrated in which.

DETAILED DESCRIPTION OF CERTAIN PREFERRED EMBODIMENTS

Figure 1:
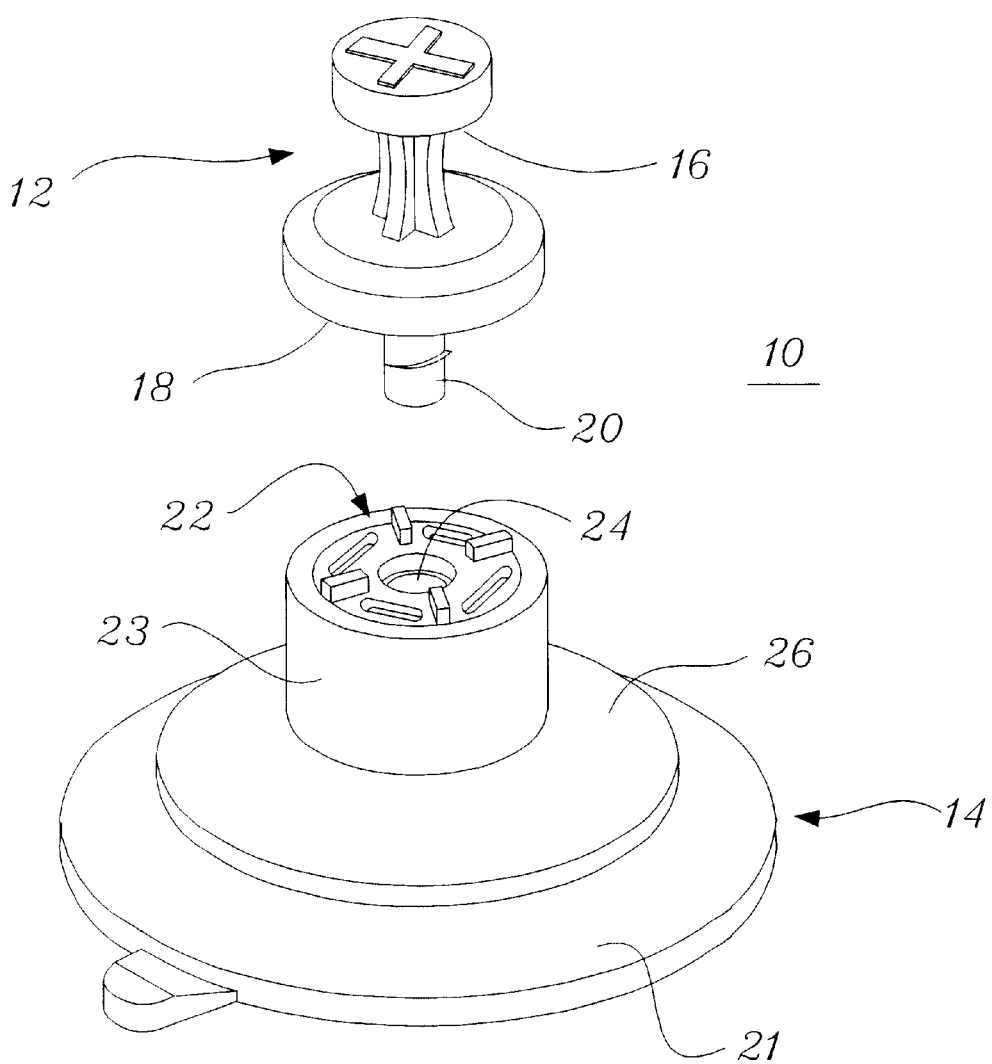
FIG. 1 is a perspective view of a present preferred embodiment of the invention.
Figure 2:
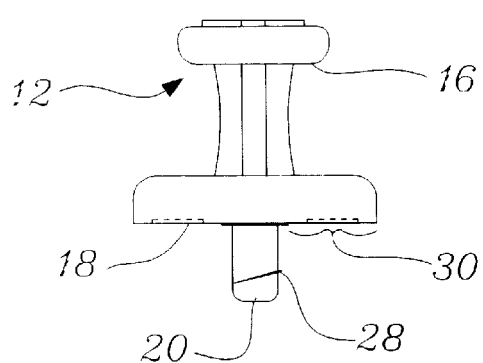
FIG. 2 is a side view of the tack shown in FIG. 1.
Figure 3:
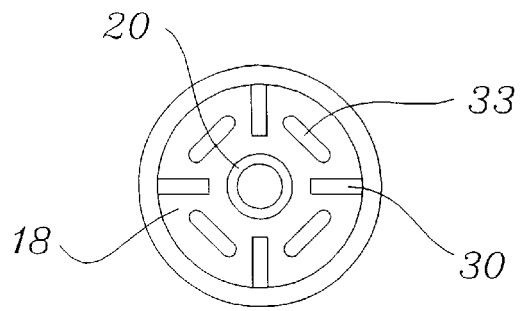
FIG. 3 is a bottom plan view of the tack shown in FIG. 1.

Referring now to the drawing figures wherein like reference numbers refer to similar parts throughout the several views, a first present preferred suction cup and tack sign holder 10 is shown in FIGS. 1 through 7. The sign holder 10 has tack 12 and a suction cup 14. The tack 12 has a gripping portion 16 extending from its top surface and a bottom mating surface 18 having a shaft 20 extending from its center. The suction cup 14 has a cup portion 21 and a neck portion 23. The cup portion 21 can have a thicker middle portion 26. A mating surface 22 is provided on the top of the neck. This mating surface is configured as a complement to the bottom of the tack. A bore 24 extends through the cup mating surface 22 and into the neck 23 to receive the shaft 20 of the tack 12.

Figure 7:
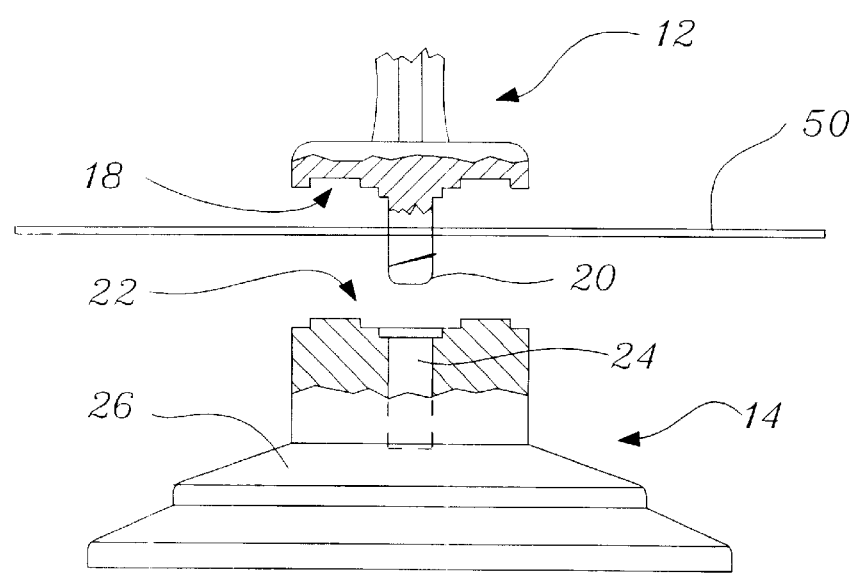
FIG. 7 is a side view partially in section of the suction cup and a portion of the tack shown in FIG. 1 illustrating a sign being placed between them.

The mating surface 18 of the tack 12 is designed to engage the mating surface 22 of the suction cup 14 and grip a portion of a sign 50 placed therebetween, as shown in FIG. 7. This gripping action is such that the weight of the sign is not supported entirely by the shaft 20 of the tack 12. With the additional gripping area provided by the mating surfaces, 18 and 22, a greater force is required to pull the sign 50 from the sign holder than is required for suction cup and tack sign holders of the prior art.

The tack mating surface 18 and the cup mating surface 22, as shown in FIGS. 2 through 6, are preferably provided with a plurality of preferably shallow concentric grooves, 30 and 34, respectively, and ridges, 31 and 33, respectively, which mate together to better grip the sign 50. The mating surfaces increase the surface area gripping the paper sign, and make the sign less likely to tear. When conventional tacks are used, the paper is held by the diameter of the pin portion, which easily slices through paper signs. The shallow ridges and grooves can also have sharp edges so as to partially perforate the material of the sign to obtain a better grip. The shallow grooves and ridges are preferably about 0.002 inch in height or depth. I have compared the force required to dislodge a sign from this sign holder with the force needed to pull the same type of sign from a prior art sign holder such as is shown in my U.S. Design Pat. No. Des. 311,933. An additional one-half pound of force was required to remove the sign from the suction cup and tack having mating surfaces.

Figure 12:
FIG. 12 is a top plan view of a sign being supported by the invention.

A sign 50 will typically be held by four sign holders. As shown in FIG. 12 the sign 50 is provided with apertures 52 at certain locations through which the shaft 20 of the tack 12 is inserted. The mating surfaces of the suction cup neck and the bottom of the tack grip a portion of the sign indicated by dotted circles 54. The shaft of the tack is frictionally engaged in the bore 24 of the suction cup 14. The weight of the sign 50 is thus supported not only by the shaft 20, but additionally by the tack mating surface 18 and the suction cup mating surface 22 which can allow the sign remain in place against downward pull forces without tearing at the holes 52. Any number of suction cups and tack holders 10 can be provided depending on the weight and shape of the sign which is to be supported.

Figure 4:
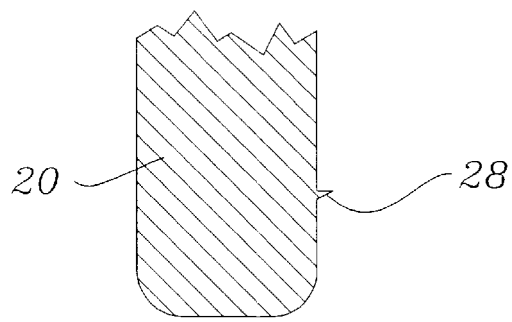
FIG. 4 is one partial cross section through the center of the shaft portion of the tack shown in FIG. 1.
Figure 5:
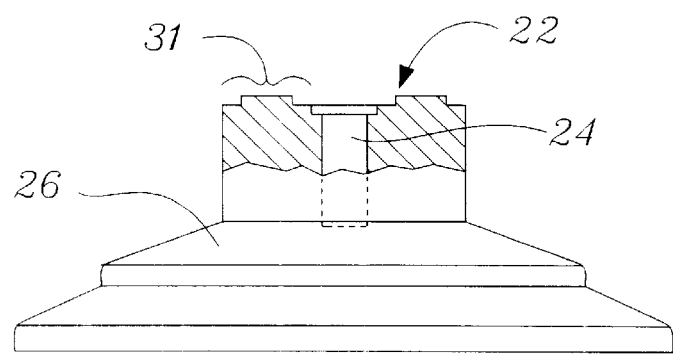
FIG. 5 is a side view partially in section of the suction cup shown in FIG. 1.
Figure 6:
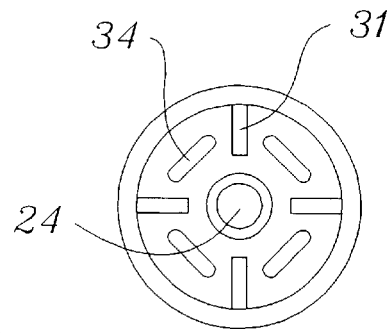
FIG. 6 is a top plan view of the suction cup shown in FIG. 5.
Figure 8:
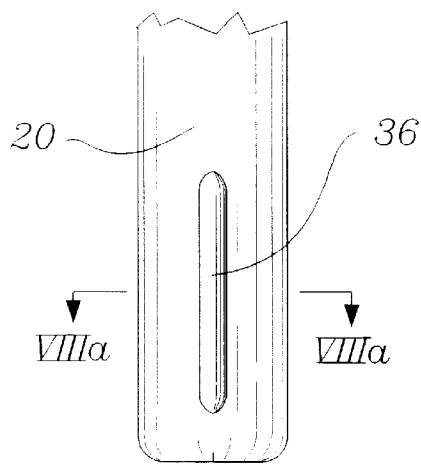
FIG. 8 is a side view of an alternative embodiment of the shaft of the tack shown in FIG. 1.
Figure 9:
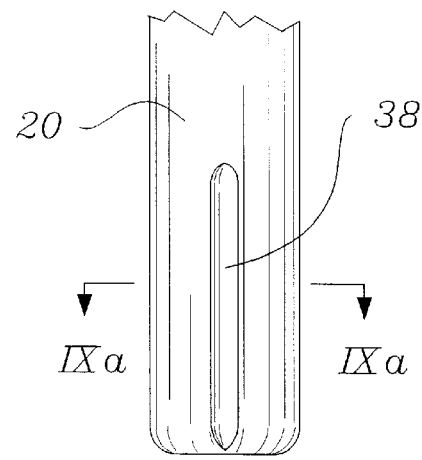
FIG. 9 is another alternative embodiment of the shaft of the tack shown in FIG. 1.
Figure 8A:
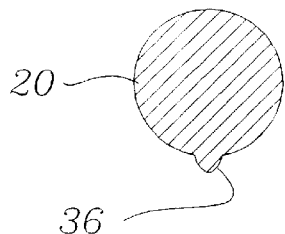
FIG. 8a is a cross sectional view of the shaft of the tack taken along line VIIIa—VIIIa in FIG. 8.
Figure 9A:
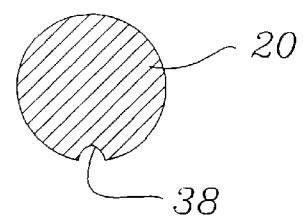
FIG. 9a is a cross sectional view of the shaft taken along line IXa—IXa in FIG. 9.

The shaft 20 of the tack 12 can be provided with an angled raised rib 28 which aids in allowing air to escape from the bore 24 of the suction cup 14 as the shaft 20 is inserted therein. The height of the raised ridge can preferably be from about 0.008 inch to about 0.035 inch, depending on its length and diameter as well as material of the suction cup. The raised rib 28 preferably has a sloping front edge and a perpendicular trailing edge, as shown in FIG. 4. The sloping front edge can allow the shaft 20 to be more easily inserted into the bore 24 while the perpendicular trailing edge can help to prevent the shaft 20 from backing out once inserted therein. The angle of the raised rib 28 preferably is about 15 degrees and the rib runs, in a thread-like fashion. This configuration allows the shaft 20 to be screwed and tightened thereby into the bore 24. Alternatively, a straight raised rib 36 or a groove 38, as shown in FIGS. 8 through 9a, can be provided on the shaft 20 to aid in allowing air to escape from the bore 24 as the shaft at 20 is being inserted therein. Additionally, one or both of the surfaces of the shaft 20 and the interior of the bore 24 can have a rough texture to further aid in allowing air to escape when the shaft is inserted into the bore.

Figure 10:
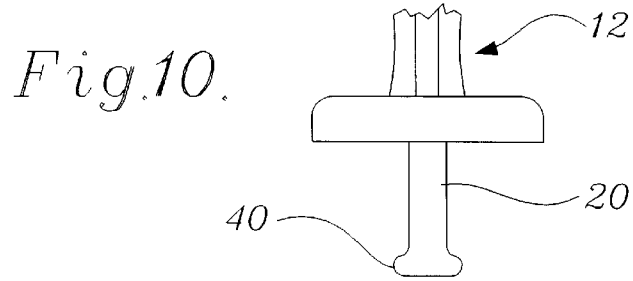
FIG. 10 is a side view showing the operative portions of another embodiment of the suction cup sign holder shown in FIG. 1.

In an alternative embodiment shown in FIG. 10, the bore 24 in the suction cup mating surface 22 is provided with an undercut bottom portion 42 and the shaft 20 can have an oversized tip portion 40. Thus, when the shaft 20 is inserted into the bore 24 the oversized tip portion 40 is snugly retained in the undercut bottom portion 42 to aid in preventing the shaft from backing out of the bore. Undercuts may be interrupted so that when inserted and turned, the tack portion is locked in place. When turned more, undercuts in the pin match with wider grooves in the cup and the pin is easily removed. Preferably, the undercut area is no more than about 0.05 inch so that the shaft 20 may still be easily ejected from the bore 24 when it is desired to remove the tack 12.

Figure 11:
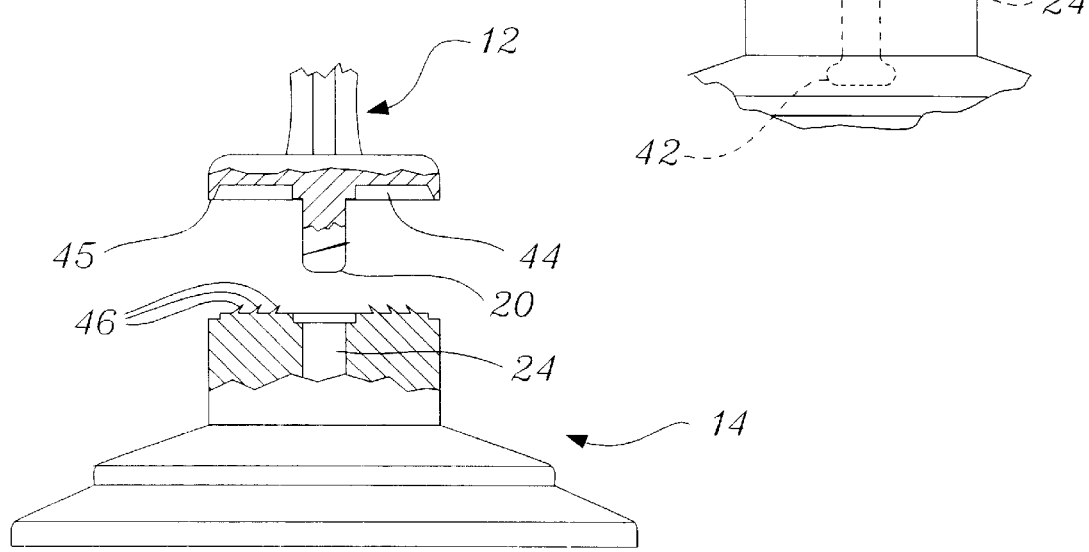
FIG. 11 is a side view partially in section of an alternative embodiment of the suction cup sign holder shown in FIG. 1.

In an alternative embodiment shown in FIG. 11, the suction cup mating surface 22 is provided with a plurality of deformable projections 46 and the tack mating surface 44 is generally flat with a single outer raised ridge 45. Deformable projections 46 on the neck of the suction cup provide increased holding power when the shaft 20 of the tack 12 is inserted into the bore 24 and the flat surface 44 compresses the sign against the deformable projections 46.

Figure 13:
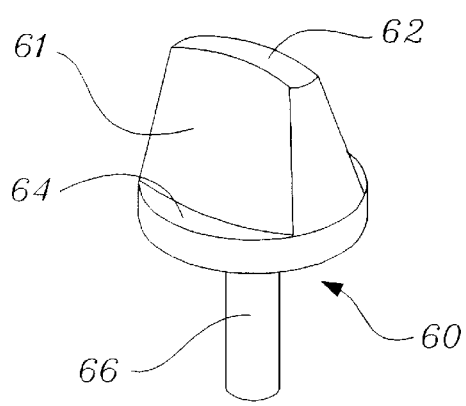
FIG. 13 is a perspective view of another tack that can be used.
Figure 14:
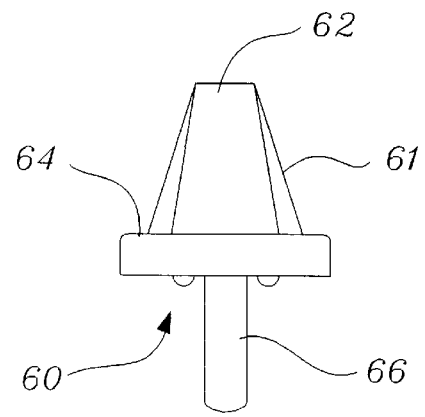
FIG. 14 is an end view of the tack shown in FIG. 13.

To make the tack more difficult for children to remove I prefer to provide a tab 62 shown in FIGS. 13 and 14 which extends from the top surface 64 of the tack 60. The tab has sloped sides 61 which are at an angle of from 74° to 89° from the surface 64 of the tack. Shaft 66 extends from the bottom of the tack and can be shaped as in any of the previous embodiments.

Figure 15:
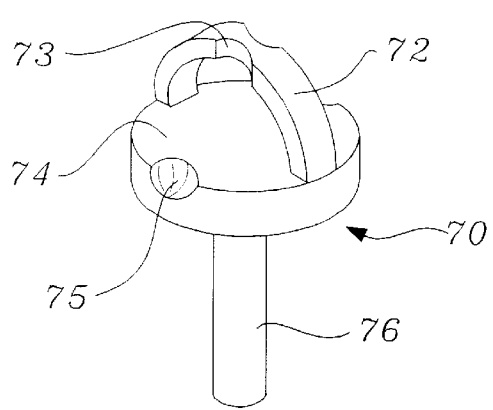
FIG. 15 is a perspective view of another tack that can be used.
Figure 16:
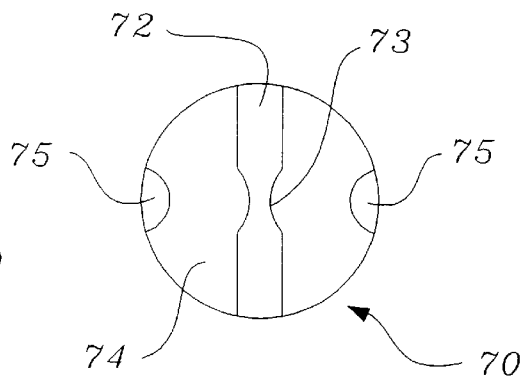
FIG. 16 is a top plan view of the tack shown in FIG. 15.

The tack 70 shown in FIGS. 15 and 16 has an arc shaped tab 72 attached to the top surface 74 for ease of gripping. Opposite sides of the tab 72 are dished out at region 73. I also prefer to dish out portions 75 of the top surface 71 for comfortable removal of the tack. Shaft 76 extends from the bottom of the tack and can be shaped as in any of the previous embodiments. Each end of the arc is attached to the top surface 74 of the tack 70. This provides an opening between the arc tab 72 and top surface 74 making the tack easier to hold.

While specific embodiments of the invention have been described in detail, it will be appreciated by those skilled in the art that various modifications to those details could be developed in light of the overall teachings of the disclosure. Accordingly, the particular embodiments disclosed herein are intended to be illustrated only and are not limiting to the scope of the invention which should be awarded the full breadth of the following claims and any and all embodiments thereof.

I claim:

1. A suction cup holder comprising:
   a. a suction cup having a cup portion and a neck extending therefrom, the neck having a longitudinal bore and a top surface having at least one projection, the at least one projection configured to mate with a bottom surface of a tack, the bore extending through the top surface; and
   b. a tack having a head, a bottom surface and a shaft extending from the bottom surface, said shaft removably disposed in said bore and wherein the bottom surface has at least one recessed area to receive the at least one projection and mate with the top surface of the neck.

2. The suction cup holder of claim 1 further comprising a single raised rib.

3. The suction cup holder of claim 2 wherein the bore has a recess sized and shaped to receive the rib.

4. The suction cup holder of claim 2 wherein said raised rib is disposed along the shaft at an angle forming a screw thread and said raised rib has a sloping leading edge and a perpendicular trailing edge.

5. The suction cup holder of claim 2 wherein said raised rib is from about 0.008 inch to about 0.035 inch in height.

6. The suction cup holder of claim 2 wherein said single raised rib is disposed along said shaft parallel to a longitudinal axis thereof.

7. The suction cup holder of claim 1 wherein at least one of said shaft and said bore have a rough surface texture.

8. The suction cup holder of claim 1 wherein the at least one projection is a plurality of ridges and the bottom surface has a plurality of grooves mating with the plurality of ridges on the top surface when said shaft is disposed in said bore.

9. The suction cup holder of claim 1 further comprising a plurality of ridges on the bottom surface.

10. The suction cup holder of claim 1 wherein the tack has a top surface, opposite the bottom surface and also comprising a tab extending from the top surface.

11. A suction cup holder comprising:
    a. a suction cup having a cup portion and a neck extending therefrom, the neck having a longitudinal bore and a top surface having at least one projection, the at least one projection configured to mate with a bottom surface of a tack, the bore-extending through the top surface, said bore having an undercut area at a bottom end of thereof; and
    b. a tack having a head, a bottom surface and a shaft extending from the bottom surface, said shaft removably disposed in said bore and wherein the bottom surface has at least one recessed area to receive the at least one projection and mate with the top surface of the neck, said shaft having an oversized tip portion the oversized tip portion removably disposed in the undercut area.

12. The suction cup holder of claim 11 wherein the shaft and the bore are cylindrical.

13. A suction cup holder comprising:
    a. a suction cup having a cup portion and a neck extending therefrom, the neck having a longitudinal bore and a top surface having at least one projection, the at least one projection configured to mate with a bottom surface of a tack, the bore extending through the top surface; and
    b. a tack having a head, with a bottom surface and a shaft extending from the bottom surface, said shaft removably disposed in said bore and wherein the bottom surface has at least one recessed area to receive the at least one projection and mate with the top surface of the neck;
        wherein the at least one projection is a plurality of ridges and the bottom surface has a plurality of grooves mating with the plurality of ridges on the top surface when said shaft is disposed in said bore.

14. A suction cup holder comprising:
    a. a suction cup having a cup portion and a neck extending therefrom, the neck having a longitudinal bore and a top surface having at least one projection, the at least one projection configured to mate with a bottom surface of a tack, the bore extending through the top surface;
    b. a tack having a head, a bottom surface and a shaft extending from the bottom surface, said shaft removably disposed in said bore and wherein the bottom surface has at least one recessed area to receive the at least one projection and mate with the top surface of the neck; and
        wherein the at least one projection is a plurality of deformable projections sized so that the plurality of deformable projections are deformed by the bottom surface when said shaft is inserted in said bore.

15. A suction cup holder comprising:
    a. a suction cup having a cup portion and a neck extending therefrom, the neck having a longitudinal bore and a top surface having at least one projection, the at least one projection configured to mate with a bottom surface of a tack, the bore extending through the top surface; and
    b. a tack having a head, a bottom surface and a shaft extending from the bottom surface, said shaft removably disposed in said bore and wherein the bottom surface has at least one recessed area to receive the at least one projection and mate with the top surface of the neck;
        wherein the tack has a top surface, opposite the bottom surface and also comprising a tab extending from the top surface; and
        wherein the tab has sloped sides which meet the top surface at an angle.

16. The suction cup holder of claim 15 wherein the tab is arc shaped and defines an opening between the top surface of the tack and the tab.

17. The suction cup holder of claim 16 wherein a portion of the tab has been dished out.

18. The suction cup holder of claim 16 wherein a portion of the top surface has been dished out.

* * * * *